(12) United States Patent  (10) Patent No.: US 6,267,124 B1
Bowden  (45) Date of Patent: Jul. 31, 2001

(54) VERTICAL CONVEYOR PARTS WASHER

(75) Inventor: Donald R. Bowden, Huntsville, AL (US)

(73) Assignee: Bowden Industries, Inc., Huntsville, AL (US)

( * ) Notice: Subject to any disclaimer, the term of this patent is extended or adjusted under 35 U.S.C. 154(b) by 0 days.

(21) Appl. No.: 09/390,707

(22) Filed: Sep. 7, 1999

(51) Int. Cl.[7] ........................................ B08B 3/12
(52) U.S. Cl. ..................... 134/71; 134/111; 134/126; 134/127; 134/130; 134/134
(58) Field of Search .............................. 134/71, 74, 111, 134/126, 127, 130, 134

(56) References Cited

U.S. PATENT DOCUMENTS

| | | |
|---|---|---|
| 736,209 | 8/1903 | Busch . |
| 737,195 | 8/1903 | Barry . |
| 768,486 | 8/1904 | Schreiber, Jr. . |
| 807,687 | 12/1905 | Schirmer . |
| 919,796 | 4/1909 | Volz . |
| 1,006,410 | 10/1911 | Schaub . |
| 1,108,539 | 8/1914 | Zahm . |
| 1,381,347 * | 6/1921 | Elgharini ........................ 134/126 X |
| 1,864,064 | 6/1932 | Hall . |
| 2,025,990 | 12/1935 | Kokemper . |
| 2,329,787 * | 9/1943 | Romano ........................... 134/71 X |
| 2,352,709 | 7/1944 | Haase . |
| 2,802,476 * | 8/1957 | Kearney ............................. 134/74 |
| 3,011,924 | 12/1961 | Rand . |
| 3,109,439 * | 11/1963 | Evans et al. ........................ 134/74 |
| 3,464,428 | 9/1969 | Kraeft . |
| 4,651,762 | 3/1987 | Bowden . |
| 6,152,154 * | 11/2000 | Elgharini ............................. 134/71 |

* cited by examiner

Primary Examiner—Philip R. Coe
(74) Attorney, Agent, or Firm—Dowell & Dowell, P.C.

(57) ABSTRACT

A method and system for immersion cleaning of mechanical parts which includes a continuous conveyor having a plurality of vertical conveyor runs which pass through one or more cleaning tanks. Each cleaning tank includes at least two turbulent wash zones. Pivotal parts carriers are supported by the conveyor and are loaded at a parts loading station and are unloaded at a parts discharge station.

20 Claims, 7 Drawing Sheets

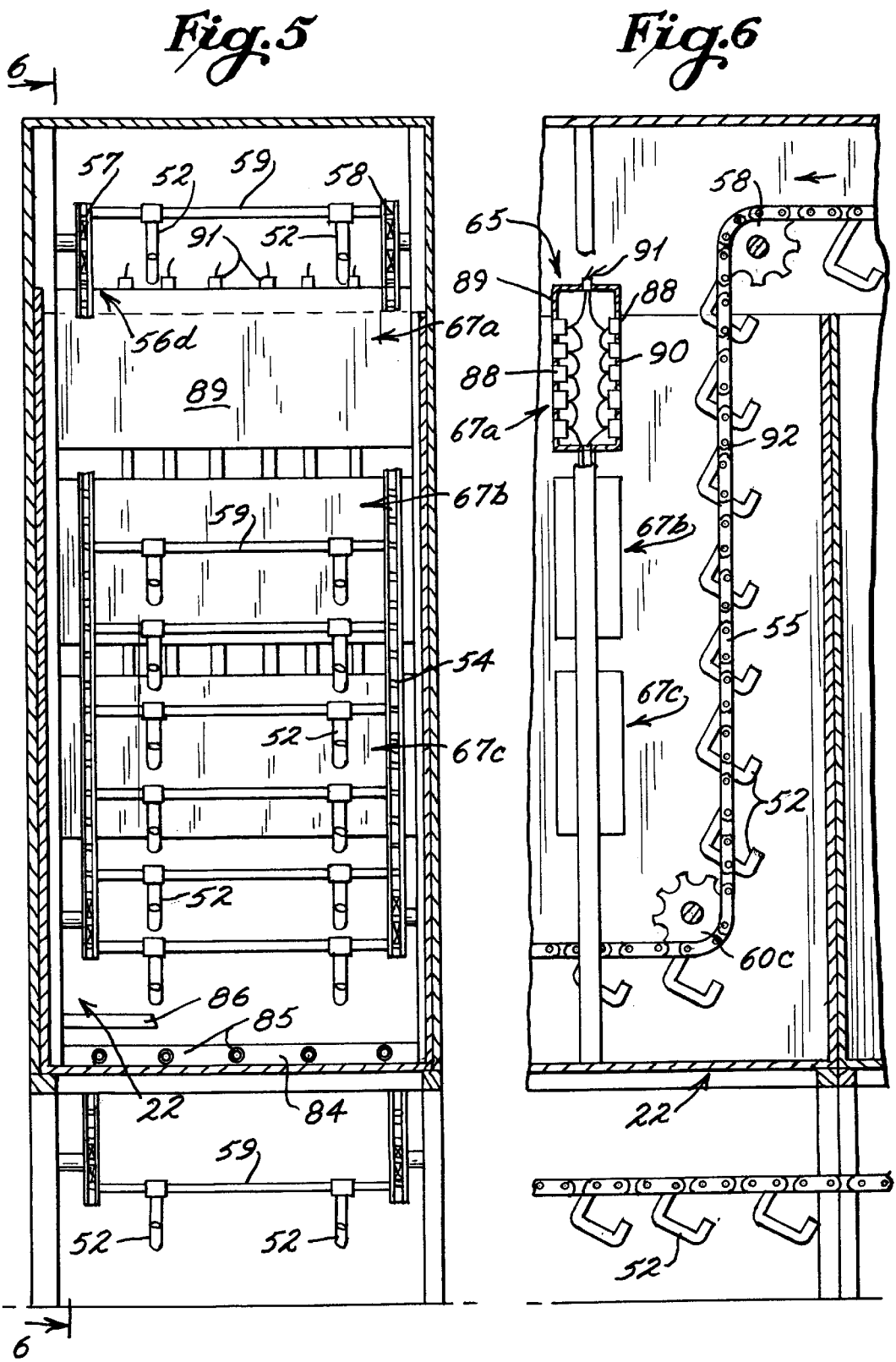

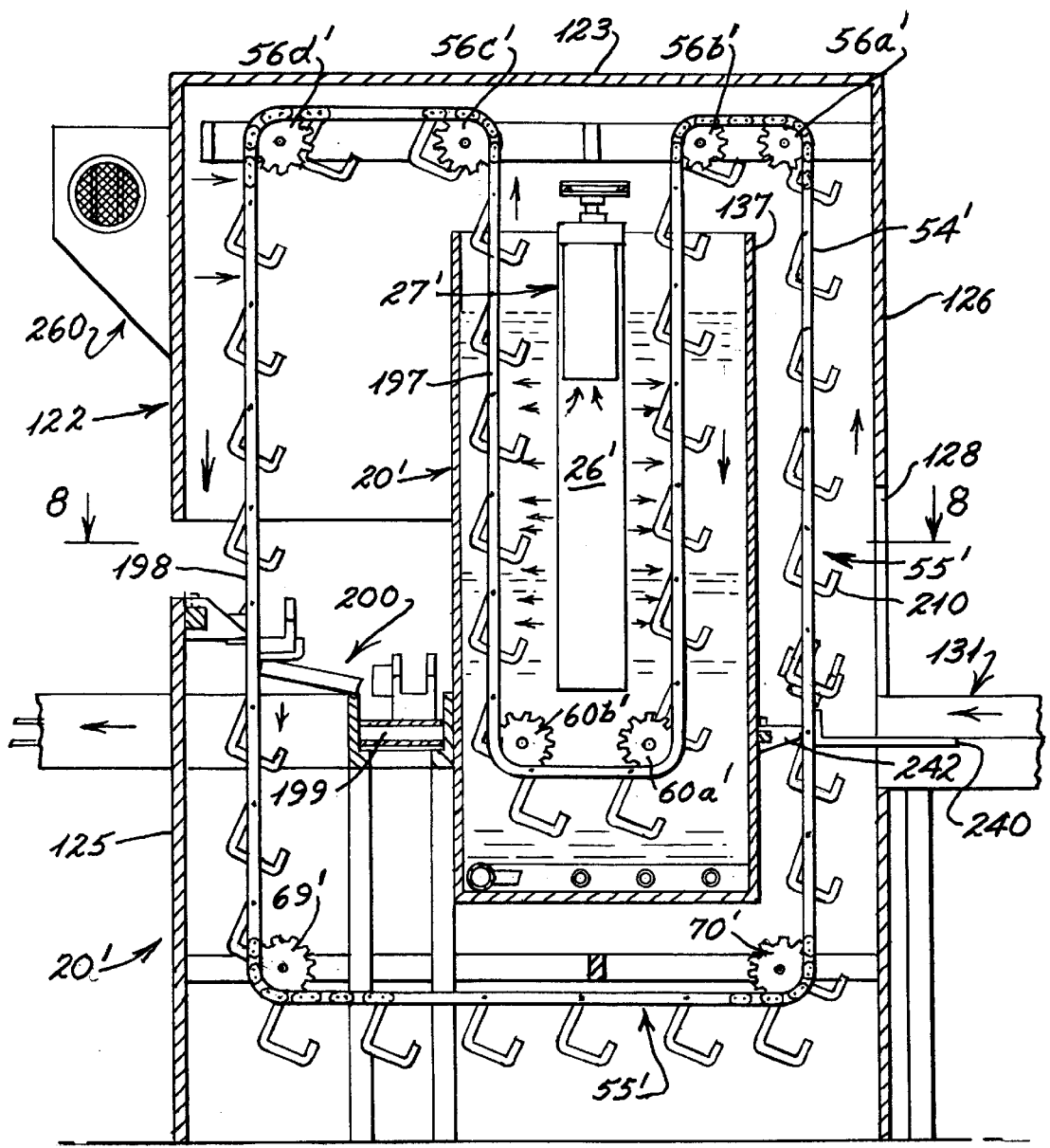

VERTICAL CONVEYOR PARTS WASHER

BACKGROUND OF THE INVENTION

1. Field of the Invention

This invention is generally directed to machines utilized in industry for cleaning mechanical parts and, more particularly, to an immersion parts cleaning system and method for cleaning mechanical parts utilizing a continuous conveyor for carrying the parts from a loading station to a discharge station. The conveyor system includes a plurality of vertical runs which pass through at least one wash or cleaning tank in which cleaning fluid is injected in a continuous manner to create turbulence for cleaning parts being conveyed therethrough. In some embodiments, a plurality of vertical runs of the conveyor system pass through a second cleaning tank which incorporates an ultrasonic insert for creating shock waves for cleaning parts to ensure complete removal of all oils, particles and other debris. In addition to the foregoing, the conveyor system may also include at least two vertical conveyor runs which pass through a tank in which parts which have been cleaned are thoroughly rinsed, after which, the parts are dried before being discharged from the system.

2. History of the Related Art

In the manufacturing industry, parts which are machined must be cleaned to remove particles of metal as well as oils, greases and other materials associated with a manufacturing process. In other industries, such as where parts are being recycled for further use, built up dirt, tars, greases and other particulates must also be removed before the parts can be effectively put to further use. In some parts cleaning systems, parts are conveyed by a conveyor through a spraying system where cleaning solutions or solvents are used to dislodge oils and particles. Unfortunately, the use of spray-type cleaning systems does not adequately remove all particles, oils or other debris from parts being cleaned. In addition, such cleaning systems usually require a great deal of floor space within a manufacturing or recycling facility thus increasing the initial installation costs of such systems. Further, the spraying of cleaning solvents creates environmental concerns.

An improvement over such spray cleaning systems are immersion systems wherein parts are loaded onto carriers or placed into baskets and are cleaned in a bath of cleaning solution. Each load of parts is immersed into a cleaning solution and the cleaning solution may be agitated to create turbulence to further facilitate the cleansing action of the cleaning agent in removing contaminants from the parts. A draw back associated with such batch-type cleaning processes is that they tend to increase the time required to clean parts. Increasing the time of cleaning increases man hours which also increases the cost of the cleaning processes. To overcome this, plants may install a plurality of wash tanks, all of which operate with bulk processes. Although providing a plurality of tanks increases the load capability of the washing system, the increased number of tanks requires additional floor space, and also increases installation and maintenance costs.

In view of the foregoing, there remains a need to provide a very compact immersion-type cleaning system which can be utilized in an environmentally compatible manner within substantially any manufacturing facility such that the system requires a minimum of floor space to be consumed but which functions to provide an efficient and generally continuous cleaning of parts.

SUMMARY OF THE INVENTION

The present invention is directed to a parts cleaning system and method for cleaning parts which includes a continuous conveyor system having a plurality of vertical conveyor runs within at least one wash tank. Each wash tank includes a cleaning solution through which at least two vertical runs of the conveyor pass. In a first wash tank, a cleaning solution is subjected to turbulent action to enhance the cleaning of the parts being carried therethrough. In some embodiments, a second wash tank is used which includes an ultrasonic insert for generating shock waves within a cleaning solution.

Also, in some embodiments, parts which have been carried through at least a turbulent wash tank or a combination of a turbulent wash tank and an ultrasonic wash tank are thereafter rinsed with the parts being carried along at least two vertical conveyor runs within a rinse tank. After rinsing, the parts are optionally dried as they are conveyed to a discharge station.

The turbulent flow wash or cleaning tank includes a fluid discharge header mounted generally centrally thereof. A turbo-charging pump assembly is mounted so as to provide a continuous recycling flow of cleaning solution within the wash tank so that cleaning solution is forced from the header and directed toward the at least two vertical runs of the conveyor which are situated on opposite sides of the header. The discharge header may include a plurality of nozzles or openings which are formed so as to create flow at different angles and orientations whereby a very turbulent washing action is created in the area of the vertical conveyor runs. In this manner, substantially all surfaces of parts being conveyed therethrough are subjected to the turbulent cleaning action.

The cleaning solutions within each of the turbulent flow wash tanks and the ultrasonic wash tanks are continuously recirculated through filtration systems to ensure removal of all contaminants from the solutions. Further, when a rinse tank is incorporated in the cleaning system, the solution within the rinse tank is also continuously recirculated and filtered to remove contaminants. When such contaminants include oils or greases, such oils and greases are removed from the cleaning solution by coalescing devices or other oil removing systems, such as skimmers.

In one embodiment, the conveyor is formed by at least two spaced chains which are supported by a plurality of sprocket assemblies. At least one of the sprocket assemblies is connected to a drive motor. A plurality of rods are mounted to the conveyor chains and support one or more parts retaining cradles, hooks or other carrier members which are pivotally secured either to the rods or are pivotal with the rods relative to the chains. The type of supporting hooks or other carrier members may be varied depending upon the type of parts to be cleaned. The system of the present invention can be utilized to wash parts from the size of small gears to parts as large as crankshafts and axles associated with automotive vehicles. Further, the carrier members may incorporate baskets for retaining a plurality of small parts with the baskets being suspended from two or more pins or hooks.

To facilitate the continuous operation of the wash system of the present invention, the system is preferably designed to be utilized with a parts feed conveyor and a parts discharge conveyor. In one embodiment, parts are conveyed to the wash system and the parts are retained on fork-like supports through which carrying hooks or other carrier members of the conveyor pass. The parts are thus retained on the supports and the conveyor moves relative thereto such that the carrier members engage the parts to be cleaned, lifting them from the supports. After parts have been cleaned, the conveyor descends to a discharge station which includes one or more discharge ramps or members. The discharge members are inclined vertically and extend between the carrier members of the conveyor. As parts descend, the discharge members engage the parts lifting them from their supported relationship with the carrier members and the parts are moved by gravity to a discharge conveyor which conveys the parts from the wash system.

It is the primary object of the present invention to provide a parts washing system and method for washing parts which includes a continuous vertical conveyor for conveying parts to be cleaned and wherein the parts are subject to the cleaning action of at least one of a turbulent cleaning solution within a turbo charged wash or cleaning tank and a cleaning solution within an ultrasonic wash or cleaning tank having an ultrasonic insert mounted therein.

It is another object of the present invention to provide a parts washing machine of an immersion type which reduces the amount of floor space required within a manufacturing or other facility in which parts are to be cleaned by incorporating into the washing system vertical conveyors which carry parts in a continuous manner from a parts loading station to a parts discharge station, with the parts being cleaned as they are moved vertically by the conveyor system.

It is also an object of the present invention to provide a parts washing system which provides a substantially continuous feed and discharge of parts to and from the cleaning system such that a maximum number of parts may be cleaned utilizing minimal floor space and minimal manual labor.

It is also an object of the present invention to provide a parts washing system which is environmentally compatible and which allows water base cleaning solutions to be used and wherein the solutions are continuously recirculated and filtered thus assuring a complete removal of contaminates from the cleaning solutions during the operation of the cleaning system.

It is a further object of the present invention to provide a cleaning system which is efficient in preserving the detergent within cleaning solutions such that little make-up detergent is necessary during prolonged periods of operation, thus saving costs on detergent supplies and also reducing the environmental impact from loss of cleaning solution from the system.

BRIEF DESCRIPTION OF THE DRAWINGS

A better understanding of the invention will be had with reference to the attached drawings wherein:

FIG. 5 is a partial cross-sectional view taken along line 5—5 of FIG. 2;

FIG. 6 is a cross-sectional view taken along line 6—6 of FIG. 5;

FIG. 7 is a cross sectional view of an alternate embodiment of cleaning system of the present invention showing, for example, a single turbo wash tank similar to that shown in FIGS. 1–6;

DESCRIPTION OF THE PREFERRED EMBODIMENT

Figure 1:
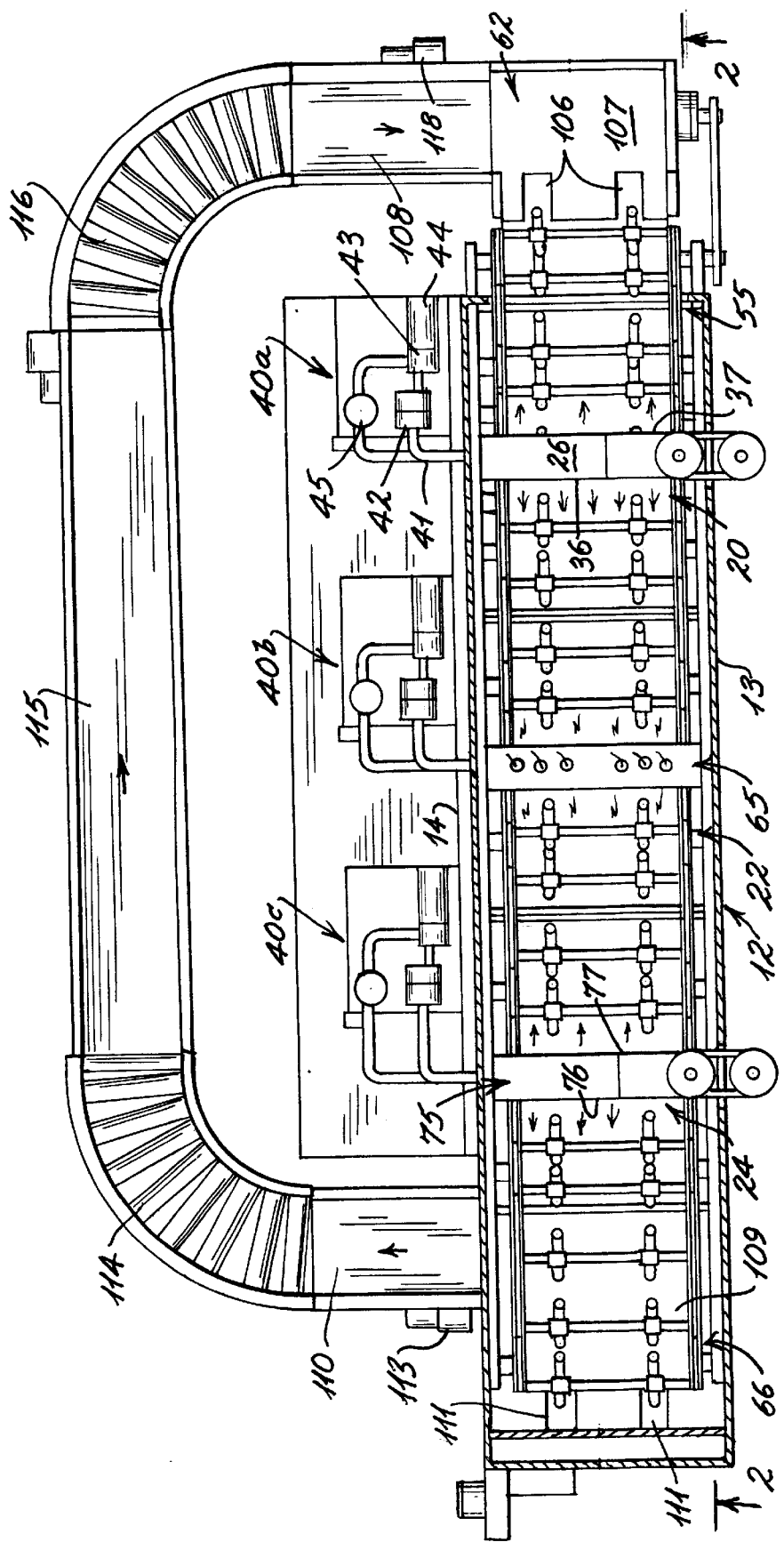
FIG. 1 is a top plan view of one embodiment of parts washing systems of the present invention.

With continued reference to the drawing figures, one embodiment of the parts washing system 10 of the present invention will be described incorporating a plurality of tanks for purposes of cleaning parts passing therethrough. It should be noted that the number of tanks and the types of solutions used in the tanks may be varied and remain within the teachings of the present invention. The system shown in FIGS. 1–6 includes an outer housing 12 having front and rear walls 13 and 14 and end walls 15 and 16. A steam cover or upper wall 18 may also be provided for purposes containing any steam or other vapors developed within the system. An appropriate vent system 19 may be provided which may include filters for removing any air entrained particulates or environmentally incompatible chemicals or agents. The housing may not be used in all embodiments of the invention.

Disposed within the housing 12 are washing or cleaning tanks and 22 and a rinse tank 24. Although three such tanks are shown in the drawing figures, the invention contemplates that additional tanks may be utilized either for washing, coating or dipping of mechanical parts or for further treating mechanical parts following cleaning and yet be in keeping with the teachings of the present invention. Further, systems can also incorporate a single wash tank, such as 20 or 22, combined with or without a rinse tank 24.

Wash tank 20 contains a water-base detergent cleaning solution which is continuously recirculated and injected under pressure through a distribution header 26 mounted generally centrally of the tank. The tank is designed as a turbo-washer and detergent solution within the tank is continuously recycled through the discharge header 26 by use of a turbo-charger 27 mounted within a housing 28 in which a rotor or propeller 29 is disposed. The rotor is driven through a pulley and bearing assembly 30 connected by a drive belt 31 to a motor 32 mounted adjacent to an upper portion of the wash tank 20. The turbo-charger draws cleaning solution from the wash tank in the direction of the arrows shown in FIG. 3 upwardly and into an upper part of the turbo-charger housing where it is discharged at high pressure downwardly into the interior of the discharge header 26. From there, the cleaning solution is forced out at substantial pressure through openings 35 formed in the opposing side walls 36 and 37 of the distribution header 26 and into the main bath within the wash tank thereby creating very turbulent streams though which parts to be cleaned are conveyed. As shown, the discharge header is closed at its upper end and is generally filled with the cleaning solution from the wash tank. Because of the substantial agitation and turbulence created by the turbo-charging mechanism, it is possible to effectively use water-base cleaning solutions within the wash tank 20. However, other types of detergents may be used for purposes of cleaning parts in keeping with the teachings of the present invention.

The opposite side walls 36 and 37 of the discharge header 26 are oriented towards the opposing side walls of the wash tank 20. The opposite side walls include a plurality of the flow directing slots orifices or openings 35 therein. Although the slots shown in the drawings are generally rectangular, the slots may take any configuration and orientation such that the openings may be specifically designed to direct washing solution at different angles from the discharge header outwardly into the wash tank. As opposed to slots or orifices, nozzles may also be positioned along the opposite side walls of the discharge header to direct liquid discharged therefrom into the wash tank. It is important that the orientation and configuration of the flow directing slots, nozzles or other directing means associated with the discharge header be designed so as to create a predetermined discharge pattern of flow into the wash tank. The openings are shown as extending generally along a substantial height of both of the walls 36 and 37 of the discharge header.

Figure 3:
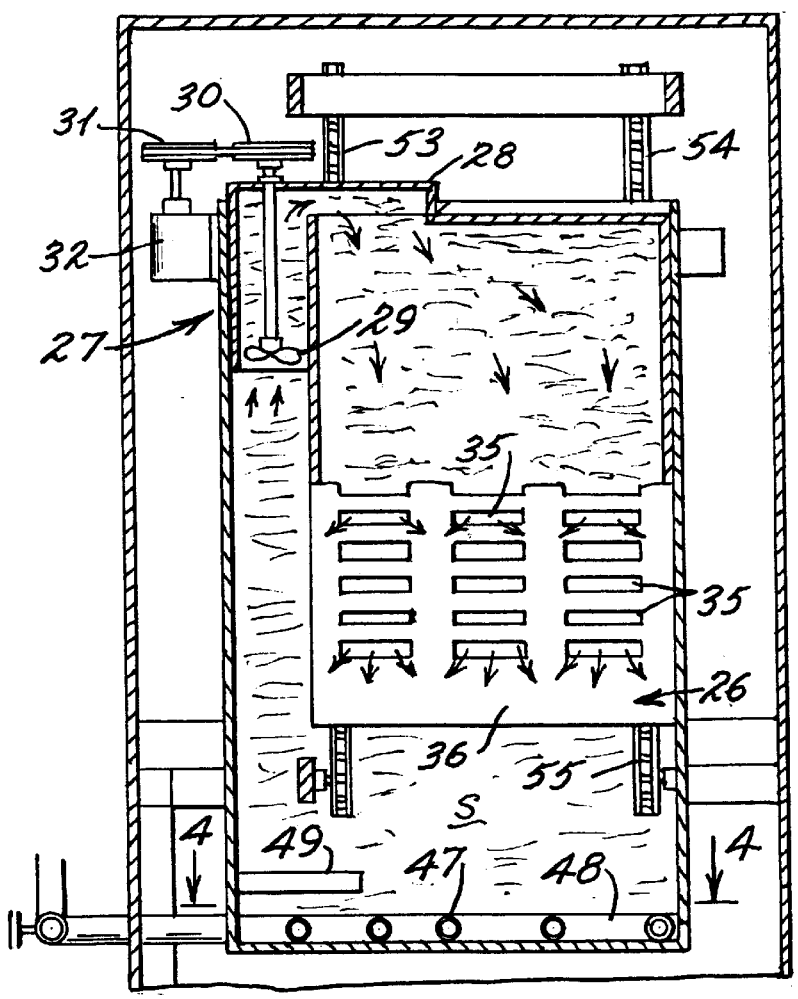
FIG. 3 is an enlarged cross-sectional view taken along line 3—3 of FIG. 2.
Figure 4:
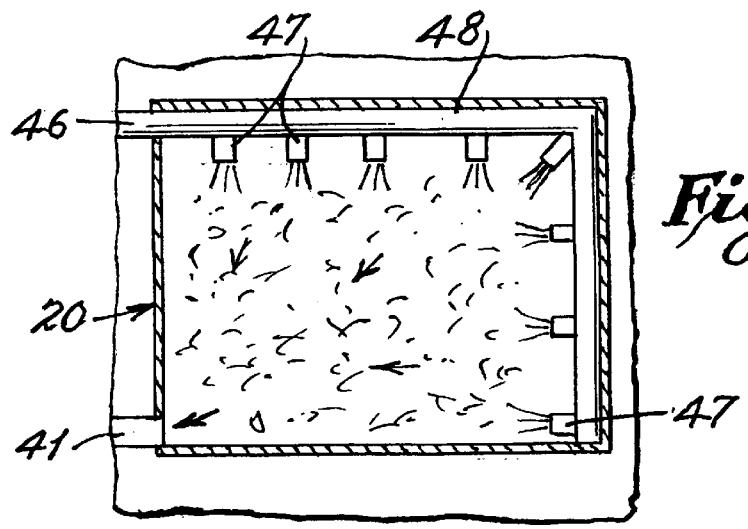
FIG. 4 is an enlarged partial cross-sectional view taken along line 4—4 of FIG. 3.

To prevent build-up of contaminants within the wash tank 20, as well as the wash tank 22 and the rinse tank 24, each tank of the present invention includes a filtration system, such as shown at 40a, 40b and 40c in FIG. 1. Each filtration system is essentially the same and, therefore, only the system affiliated with the wash tank 20 will be discussed in detail. As shown in FIGS. 1, 3 and 4, situated along the lower portion of tank 20 is a discharge outlet 41 which extends to a pump 43 driven by a motor 44. The pump draws liquid through a strainer 42 and thereafter through a filter unit 45. Wash solution passing through the filter 45 is redirected or introduced into the wash tank through a fluid inlet 46 provided adjacent the lower portion of the wash tank. The inlet 46 includes a plurality of spaced nozzles 47 extending from a manifold pipe 48 disposed within the wash tank. The nozzles are oriented so as to direct fluid flow, and thus any contaminants, toward the discharge outlet 41, thereby ensuring that particles and other contaminants within the wash solution are effectively removed by the filtration system 40a.

Many manufactured parts are contaminated with chips, fines, and other materials, in addition to the residual machining oil. These contaminants must also be removed to extend the useful life of the cleaning solution. Most contaminants will be held in suspension by the turbulent cleaning fluid, but many chips and heavier fines will settle to the bottom of the cleaning tank even while the tank fluid is being agitated. A build-up of such metals at the bottom of the tank can result in serious problems if not removed periodically. For example, fluid heater elements 49 may be used to heat the cleaning solution. These elements are located near the bottom of the tank and a build up of metal particles at the bottom could interfere or disable the heaters. Further, some materials after an extended exposure to a hot environment will solidify and become very difficult to remove. The present invention is designed to prevent such build-up of solids by pumping fluid from the tank toward the outlet 41 at a bottom corner, straining and filtering the solution, as previously discussed, and returning the solution, under pressure, to the internal tank manifold 48 located at the bottom of an adjacent corner. The internal tank manifold is routed around the tank floor along the two tank walls opposite the filter outlet. Both sections are equipped with the nozzles 47, each pointed toward the filter outlet 41. The return flow provides sufficient fluid current along the bottom of the tank to sweep chips and heavier particles to the outlet where they are removed, along with suspended contaminants, by the filtration circuit pump.

As noted, it is also preferred to elevate the temperature of the cleaning solution "S" within a wash tank. In this respect, one or more immersion heating elements 49 are mounted to extend into the wash tank adjacent the lower portion thereof, as is shown in FIG. 3. Each tank of the invention may include similar heating elements.

Figure 2:
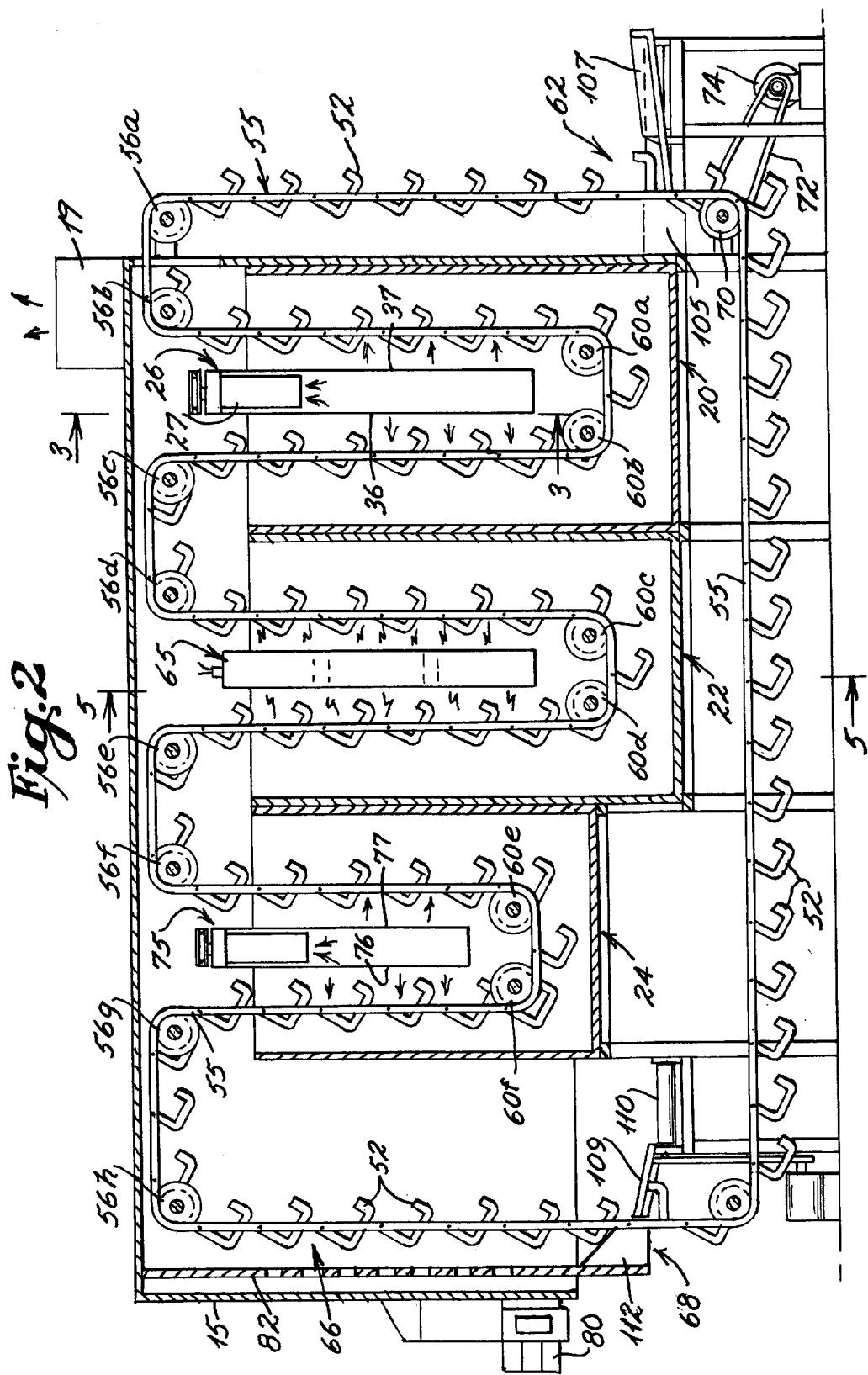
FIG. 2 is a cross-sectional view taken along lines 2—2 of FIG. 1.

In the embodiment of FIGS. 1–6, the parts to be cleaned within the tank 20 are conveyed by appropriate carriers or hooks 52 which are mounted in spaced relationship relative to one another to a pair of chains 53 and 54 of an endless conveyor system 55. The manner in which the carriers are mounted to the chains of the conveyor system 55 will be discussed in greater detail hereinafter. The chains are guided over a plurality of double sprocket support assemblies. With reference to FIG. 2, eight such double sprocket assemblies are shown at 56a, 56b, 56c, 56d, 56e, 56f, 56g and 56h, above the tanks 20, 22 and 24. Each sprocket assembly includes a pair of sprockets 57 and 58 which are freely rotatably mounted to a support shaft 59, see FIG. 5. Each of the double sprocket assemblies is mounted to a frame adjacent the upper portion of the housing 12. In addition, the conveyor system also includes two double sprocket assemblies 60a, 60b, 60c, 60d, 60e and 60f mounted in spaced relationship within each of the wash tanks 20 and 22 and the rinse tank 24. Each of these double sprocket assemblies also includes a pair of sprockets idly mounted on a shaft connected to or through the side walls of each of the respective wash or rinse tanks. In this manner, the two chains of the conveyor system follow a serpentine vertical path, first upwardly from a loading station 62, shown in FIG. 2, through an opening 63 in the side wall 16 of the housing and over the first and second double sprocket assemblies 56a, 56b and then descending through the wash tank 20 such that the conveyor passes intermediate the discharge header 26 and a side wall of the wash tank. Thereafter, the endless conveyor is redirected horizontally by a first lower double sprocket assembly 60a and then upwardly by another double sprocket assembly 60b such that the upward vertical conveyor run extends intermediate an opposite side wall of wash tank and the discharge header 26. The conveyor thereafter passes over the next two upper double sprocket assemblies 56c, 56d and downwardly so as to be intermediate an ultrasonic insert 65 which is mounted within the ultrasonic washing chamber 22 and a side wall thereof. The conveyor thereafter passes around the lower double sprocket assemblies 60c and 60d and then upwardly over a pair of double sprocket assemblies 56e and 56f and then downwardly about lower double sprocket assemblies 60e and 60f mounted within the lower portion of the rinse tank. Thereafter, the conveyor extends upwardly over another pair of double sprocket assemblies 56g and 56h, after which the endless conveyor extends downwardly through a drying chamber 66 to a discharge station 68. After passing through the discharge station 68, the conveyor chains extend about a first lower double sprocket assembly 69 and horizontally beneath the rinse and wash tanks back to a double drive sprocket assembly 70 adjacent the loading station 62. The drive sprocket assembly 70 is connected by a drive chain 72 to an appropriate motor 74.

From the foregoing description, it should be noted that the various vertical runs of the conveyor provide two passes of all parts being carried by the conveyor through each of the wash tanks 20 and 22 and the rinse tank 24. The vertical runs extend intermediate the discharge header 26 and the opposite side walls of the wash tank 20 and intermediate the ultrasonic insert 65 of the ultrasonic cleaning tank 22 and the opposite side walls thereof and intermediate a discharge header 75 provided generally centrally in the rinse tank 24. The header 75 is substantially the same structure as disclosed with respect to discharge header 26. The discharge header 75 is provided with a turbo-charger and fluid is directed outwardly on opposite sides 76 and 77 of the discharge header toward the opposite side walls of the rinse tank.

In view of the foregoing and with specific respect to the wash and rinse tanks 20, 22 and 24, the structure of the present invention ensures that parts being conveyed therethrough are throughly cleaned and rinsed on both sides. In tanks 20 and 24 the turbulent flow is more powerful the closer the part is to the discharge orifices 35. In the conveyor orientation, one side of each part is closer to the discharge orifices while going down a conveyor run, and the other side is closest while going up a conveyor run. This double flow of turbulent fluid washes the parts on the chain conveyor as they are being lowered into a tank and washes or rinses them again as the parts are being raised on the other side of the tank. The turbulent jet streams therefore impinge the parts with maximum force from opposite sides as they move through the tanks and equalize the overall cleaning and rinsing of the parts. The double run of the conveyor within the tanks 20 and 24 together with the two-sided turbocharger makes it possible to properly balance the cleaning of the parts.

Another benefit of the present invention is that the conveyor assembly can be expanded vertically. Also, the wash tanks and rinse tanks may also be extended vertically and thus additional cleaning capacity can be obtained without requiring additional floor space to be consumed.

To at least partially dry parts being cleaned and rinsed utilizing the system of the present invention, a blower assembly 80 is mounted along the last vertical conveyor run adjacent to the discharge station 68. The blower directs a stream of heated or non-heated air through a diffuser panel 82 such that the air is directed against parts before they reach the discharge station.

With continued reference to FIGS. 5 and 6, the details with respect to the ultrasonic cleaning tank 22 are shown. The cleaning solution "S" within the tank is recirculated and filtered as previously discussed with respect to the turbulent wash tank 20 utilizing the filtration system 40b. Fluid is introduced into the tank 22 through a fluid header 84 having a plurality of nozzles 85 associated therewith. Also, the solution may be heated utilizing an immersion heater 86.

The ultrasonic insert 65 consists of a plurality of individual transducer housings 67a, 67b and 67c, which are mounted centrally of the tank 22. In order to show the manner in which the transducers are mounted within each of the housings, transducer housing 67a is shown in cross-section in FIG. 6. A plurality of rows of transducers 88 are mounted against each of the side walls 89 and 90 of the housing and are electrically connected by appropriate conductors 91 to an external electronic generator (not shown). The ultrasonic generator produces frequencies in the 20 kHz to 100 kHz range, typically about 27 kHz. The power output frequency of the generator is determined by the type and size of the parts to be cleaned.

As the ultrasonic transducers 88 are secured to the opposite sides of each of the ultrasonic insert housings 67a, 67b and 67c, the ultrasonic energy is generated from both sides of each housing to the wash solution within the tank 22. Sound waves in the wash solution have high pressures ahead of them and low pressures in back. As the sound waves pass through the solution, the pressures can reach values below that of the liquid cohesive forces and thereby numerous small empty cavities are produced in the liquid. Some of these small cavities have such a size that they enter into resonance with the frequency of the sound waves. Thus, the cavities begin to oscillate and collapse releasing strong shock waves. In a high intensity cavitation field, bubbles implode millions of times per minute and release powerful shock waves that impinge against any submerged object in the liquid. These shock waves provide the scrubbing action in the ultrasonic cleaning tank.

Utilizing the vertical conveyor system, the parts being conveyed through the ultrasonic cleaning tank are handled in such a manner that one side of the parts will be directly oriented toward the transducer insert housings 67a–c when passing through a first vertical run, such as shown at 92 in FIG. 6, but will be oriented so that the opposite side of the parts is towards the housings 67a–c when being elevated upwardly along another conveyor run from the tank 22, as shown in FIG. 2.

With specific reference to FIGS. 1 and 2, when the carriers 52 of the conveyor approach the loading station 62, they are pivoted upwardly and outwardly by engagement with a deflector 105. As the extended carriers pass between open slots 106 in a loading platform 107, they will engage and retain parts being conveyed by a feed conveyor 108 to the platform 107 which is inclined so that the parts are moved by gravity toward the carriers. Such loading may be done manually or automatically. At the discharge station 68, the parts may be manually unloaded onto a discharge conveyor 110 or may be automatically unloaded. Adjacent to the discharge conveyor 110 is a chute 109 having spaced open slots 111 therein through which the carriers 52 may pass. As the carriers descend toward the chute 109, they are pivoted outwardly by a discharge deflector 112 so that a part carried thereon is positioned over the chute. As the conveyor 55 continues, the carriers pass through the slots 111 and the parts are captured by the chute and fall by gravity to the discharge conveyor.

As previously discussed, once parts have been conveyed through the entire washing system, they are discharged onto the discharge conveyor 110. The conveyor 110 is a continuous conveyor driven by a motor assembly 113. From the conveyor 110, the parts are carried by an unpowered gravity conveyor 114 to a packing area generally designated at 115. At the packing area, parts which are cleaned are removed and parts to be cleaned are placed onto a conveyor 116 which carries the parts to feed conveyor 108, powered by a motor 118, which conveys the parts to the loading station 62.

The system disclosed and shown in the FIGS. 1–6 has the loading station mounted at one end of the system and the discharge station at the opposite end. The system may also function by providing both the loading station and the discharge station at the same end of the cleaning system. Further, as also previously discussed, the parts may be manually loaded and unloaded with respect to the carriers 52 of the cleaning system.

In operation, the loaded parts are first conveyed into the turbulent wash chamber 20 where the parts are subjected to the turbulent flow coming from the discharge header 26. The carriers thereafter descend and ascend sequentially through the cleaning solution within the ultrasonic cleaning tank 22. The parts are thereafter conveyed to the rinse chamber 24 where again the parts are subjected to the turbulent discharge of fluid from the discharge header 75. The parts are thereafter conveyed through the drying chamber 66. The movement of the conveyor is in a generally continuous motion. At the discharge station 68, the cleaned parts are unloaded to the discharge conveyor 110.

With specific reference to FIGS. 7–17, an alternate embodiment of the present invention is shown wherein a single turbulent washer tank 20' is used. The parts washing system 20' includes an outer housing 122, including an upper wall 123, rear wall 124, opposite side walls 125 and 126 and a front wall 127. The housing may be formed having removable panels to allow access to the interior thereof, although such movable panels are not shown in the drawing figures. In some embodiments, it may be possible to utilize the washing system without the outer housing.

Figure 8:
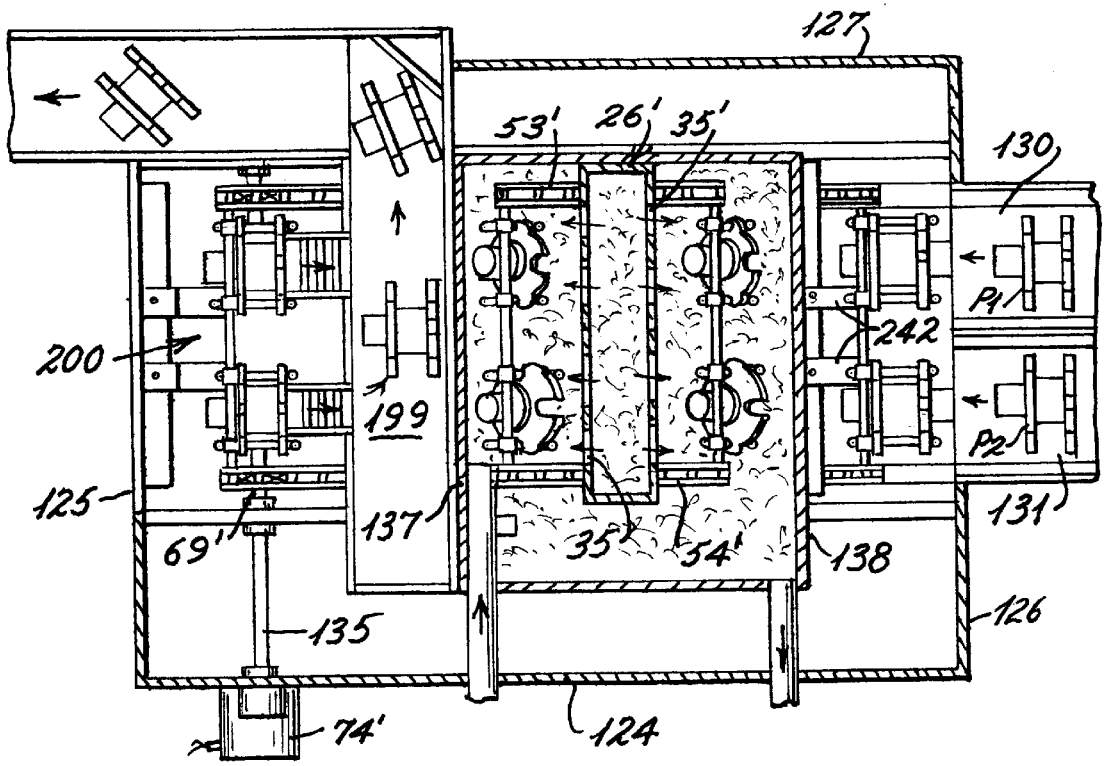
FIG. 8 is a cross sectional view taken along line 8—8 of the embodiment of FIG. 7.

The housing includes an opening 128 in the side wall 126 in which one or more parts feed conveyors 130 and 131 extend. In FIG. 8, two conveyors are shown, each carrying a part $P_1$ and $P_2$ to be cleaned. The feed conveyors are generally horizontal continuous conveyors which support the parts being moved towards the washing system. In some embodiments, additional conveyors may be provided and in others, only a single conveyor may be provided, depending upon the type and number of parts to be cleaned. The parts $P_1$ and $P_2$, shown in drawing FIG. 8, require specific carrier members associated with a continuous conveyor 55' which is the same as previously described with respect to FIGS. 1–6.

Mounted within the housing 122 is the wash tank 20' which is the same as previously described. Mounted within the wash tank and intermediate the sides thereof is an enclosed discharge header 26'. The discharge header has opposite side walls or faces which are oriented toward the side walls 137 and 138 of the wash tank and through which a plurality of flow directing slots or openings 35' are provided. Although the slots are shown as being generally rectangular in the drawing figures, the slots may take any number of configurations and orientations so as to direct washing solution from the discharge header outwardly into the wash tank as previously described. Also, as opposed to slots or openings, small nozzles may also be positioned along the faces to direct the wash solution discharged therefrom.

To provide a continuous source of turbulent fluid flow from the discharge header 26', a turbo-charging mechanism 27', as previously described, is provided. The turbo-charger draws cleaning solution from the wash tank in the direction of the arrows shown in FIG. 7 upwardly and into an upper part of the turbo-charger assembly where it is discharged at high pressure downwardly into the interior of the discharge header. From there, the liquid is forced out at substantial pressure through the openings 35' into the main bath or solution within the wash tank, thereby creating very turbulent streams within the wash tank through which parts to be cleaned are conveyed.

The conveyor 55' is a continuous conveyor which, in the embodiment, includes the pair of spaced continuous conveyor chains 53' and 54' on which carriers are pivotally mounted. To guide the conveyor chains within the housing, sets of double sprocket assemblies 56a', 56b', 56c' and 56d' are mounted on a reinforcing frame adjacent the upper portion of the housing and two double sprocket assemblies 69' and 70' are mounted in spaced relationship adjacent a lower portion of the housing 122. Each double sprocket assembly functions as previously described in the embodiment of FIGS. 1–6. To drive the sprocket assemblies to move the chains 53' and 54', a shaft 135 associated with the drive sprocket assembly 69' extends outwardly to a drive motor 74'. The motor is used to drive the double sprocket assembly 69' thereby driving the remaining double sprocket assemblies which function as idler assemblies.

As shown in FIG. 7, the conveyor 55' includes a first vertical conveyor run 192 which extends vertically between the side wall 126 of the housing and the side wall 137 of the wash tank. The conveyor chains thereafter extend over the double sprocket assemblies 56a' and 56b' and then downwardly into the wash tank 20' so as to be intermediate one face of the discharge header 26' and the side wall 137 of the wash tank. Mounted within the wash tank are two lower double sprocket assemblies 60a' and 60b' which are similar to those previously discussed which also act as idler guides about which the conveyor chains pass within the lower portion of the wash tank. Each of the double sprocket assemblies are mounted on support rods which are fixedly attached to bearing assemblies, not shown, secured to the front and rear walls of the wash tank. A first downward vertical run 193 of the conveyor passes around the lower double sprocket assemblies within the wash tank and a second upwardly extending conveyor run 197 is positioned between an opposite face of the discharge header and an opposite side wall of the wash tank. The conveyor thereafter extends over the double sprocket assemblies 65c' and 65d' to a further vertical run 198. The vertical run 198 of the conveyor extends between the side wall 125 of the housing and a side wall of the wash tank and passes adjacent to a discharge conveyor 199 which extends outwardly from a discharge station 200 on which parts which have been cleaned are conveyed.

As discussed above, in the embodiments of the present invention, at least two vertical conveyor runs are provided within each wash tank such that parts to be cleaned are cleaned by the turbulent action created by the turbo-charger system associated with the discharge header or the sonic action of an ultrasonic wash tank. As parts are moved vertically downward along conveyor run 193, they are subjected to the turbulent action of the cleaning solution created by the flow from the discharge header. In a like manner, the parts being conveyed along vertical run 197 are also subjected to the turbulent cleaning action of the cleaning solution caused by the turbo charge system.

Although it is possible to utilize the cleaning system of this embodiment of the present invention by manually loading parts onto the conveyor and manually removing parts therefrom, as previously noted, it is preferred to utilize the cleaning system with a parts feed conveyor 130 and a parts discharger conveyor 199 to provide continuous movement of parts to and from the cleaning system.

Figure 11:
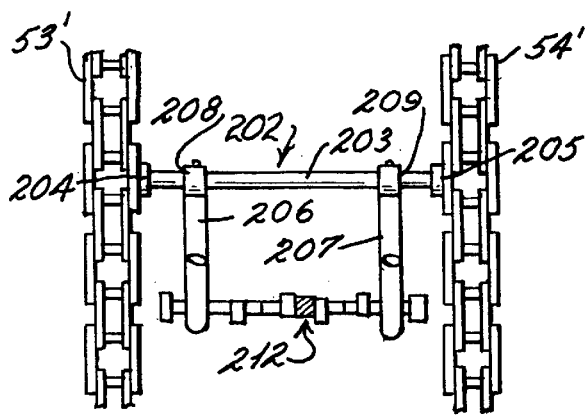
FIG. 11 is a partial front plan view of a first alternate embodiment of carrier member associated with the conveyor system of the present invention showing a crank shaft being carried by a pair of spaced hooks.
Figure 12:
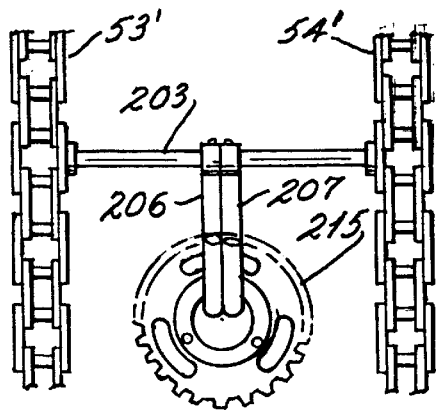
FIG. 12 shows a second alterative carrier member similar to that of FIG. 11 showing a single hook for carrying gears and bearings utilizing the conveyor system of the present invention.
Figure 13:
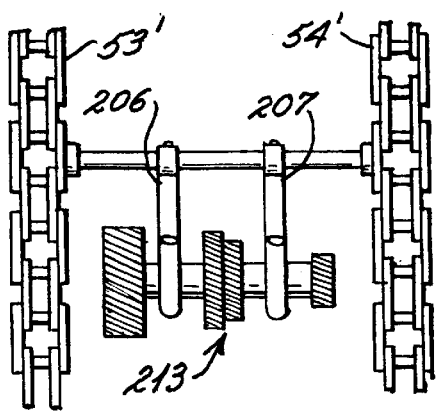
FIG. 13 is a view similar to FIG. 11 showing a different part being carried by the spaced hooks, with the hooks being spaced at a different distance relative to one another.

The present embodiment incorporates a number of carriers which are designed to be mounted to the conveyor chains 53' and 54'. With specific reference to FIGS. 11 through 17, a number of examples of carriers are disclosed. In FIG. 11, a double hook carrier system 202 is shown which includes a plurality of support rods 203 which are mounted to bearings 204 and 205 which are in aligned relationship with respect to one another at spaced points along the length of each of the chains 53' and 54'. Mounted on the rods 203 are a pair of hooks 206 and 207. Each hook has an upper open bearing portion 208 of a size to receive the rod 203 and may be adjusted relative to one another and then locked into place utilizing locking mechanisms, such as a set screw 209. It is preferred that the hooks 206 and 207 be pivotal relative to the chains 53' and 54'. In this respect, either the upper bearings 208 associated therewith or the bearings 204 and 205 for mounting the support rods 203 will allow either pivoting movement of the rods 203 or pivoting movement of the hooks 206 and 207 with respect to the rods 203. This is important to maintain the vertical alignment of the hooks as they pass through the various conveyor runs of the conveyor system as previously discussed. In the drawing figures, such as FIGS. 7, 9 and 10, the carriers are shown as including a modified form of hooks which are generally more U-shaped, thereby forming a larger cradle for supporting parts. These hooks are designated at 210 in the drawing figures. These hooks, however, are similarly mounted so as to be pivotable to retain their generally vertically suspended relationship with the conveyor chains regardless of their position within the conveyor system 55'. As shown in FIG. 11, the hooks 206 and 207 can be utilized to support relatively large parts to be cleaned, including crankshafts, camshafts, axles and the like generally shown at 212. A variation of the double hook assembly is shown at FIG. 13 wherein a gearing component 213 is shown as being supported by the hooks 206 and 207 which have been adjusted in spaced relationship to one another. In FIG. 12, hooks 206 and 207 are shown as being connected to a support rod 203 for supporting smaller parts, such as a gear 215.

Figure 14:
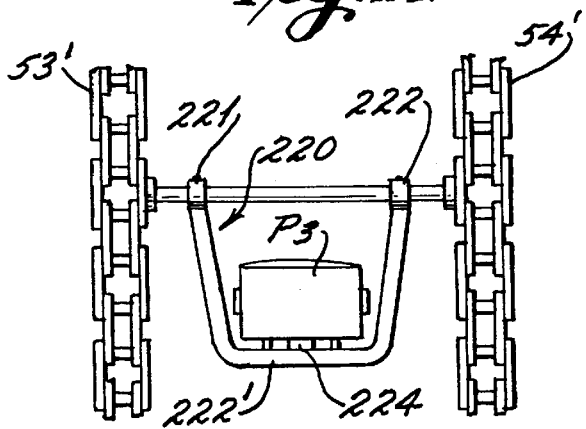
FIG. 14 shows another variation of carrier member utilized with the conveyor of the present invention in which a U-shaped component carries a pin for engaging an opening in parts having holes therethrough.

With specific reference to FIG. 14, another embodiment of carrier member is disclosed wherein the hooks are replaced by a generally U-shaped cradle member 220 which is supported at its opposite ends by bearings 221 and 222. As with the previous embodiments, the cradle 22o is pivotal relative to the chains 53' and 54'. Mounted at the base 222' of the cradle is an upwardly extending pin 224 which is engageable within an opening within a part $P_3$ shown in the drawing. This type of cradle member allows the supporting of parts having openings such that the parts can be suspended from the pin 224 of the cradle member.

Figure 15:
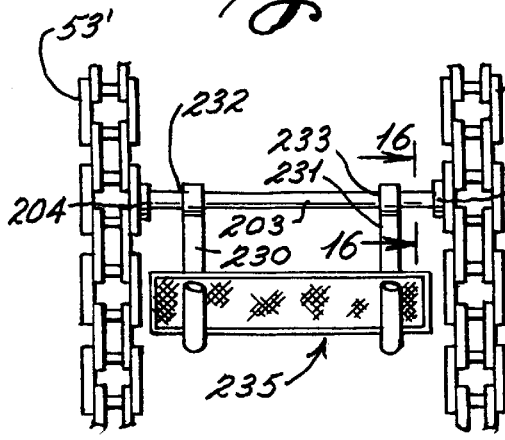
FIG. 15 is a partial front plan view of a further carrier member of the present invention incorporating a basket and support pin arrangement in which loose parts may be received within the basket.
Figures 16, 17:
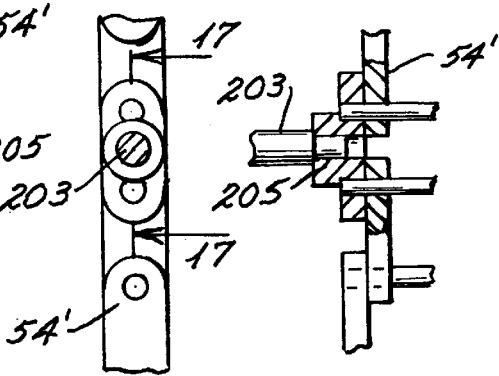
FIG. 16 is a cross sectional view taken along line 16—16 of FIG. 15.
FIG. 17 is a cross sectional view taken along line 17—17 of FIG. 16.

With respect to FIG. 15, another variation of carriers is disclosed which incorporates a pair of support pins or hooks 230 and 231 which depend from the support rod 203. As with the previous embodiments, either pivotal bearings such as 232 and 233 may be utilized to support the pins from the rod 203 or the rod is pivotal within the bearings 204 and 205 connected to the conveyor chains. The pins 230 and 231 support a basket member 235 in which loose parts may be retained.

Figure 9:
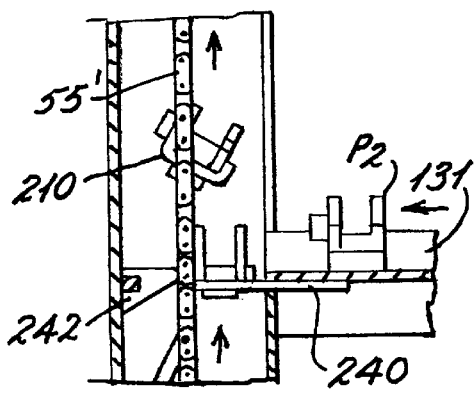
FIG. 9 is a partial cross sectional view illustrating the interaction between a parts feed conveyor and the loading elements for the conveyor system of FIG. 7.
Figure 10:
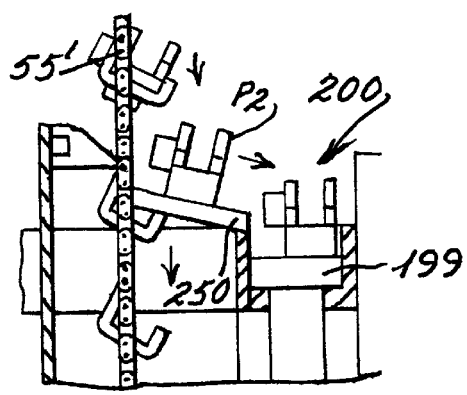
FIG. 10 is a partial cross sectional view showing discharge members for discharging parts from the conveyor system of FIG. 7 onto a parts discharge conveyor.

To load parts onto the carriers of the present embodiment, and as shown in FIGS. 7 and 9, adjacent the inlet opening into the housing is a parts loading station which includes a plurality of spaced fixed support arms 240. The support arms receive parts being conveyed by the parts conveyors 130 or 131. As the parts rest on the supports 240, the carriers, such as the hooks 210, pass upwardly between the supports 240 and engage or cradle the parts $P_1$ and $P_2$ such as shown in FIG. 7. To assist in the parts loading, deflector blocks 242 are mounted adjacent to the chains. These blocks will force or pivot the support carrier members, such as the hooks 210, relatively forward, as shown by the arrow in drawing FIG. 7, to engage to bottom portion of the parts $P_1$ and $P_2$ lifting them from the support surface 240.

With continued reference to FIGS. 7–10, after a part has been cleaned by passing through the wash tank, the parts are lowered relative to the discharge conveyor 199. Adjacent to the discharge conveyor are one or more discharge slides or chutes 250, which are inclined relative to the vertical. The chutes are spaced relative to one another so as to be intermediate the carriers. Adjacent to the conveyor chains is a discharge deflector 252 which is designed to engage the rear portion of the carrier members and pivot them somewhat forwardly, as shown by the arrow in FIG. 7, as they pass adjacent to the chutes 250. The chutes will separate the parts $P_1$ and $P_2$ from their cradled relationship with the hooks and the parts will fall by gravity onto the discharge conveyor.

With specific reference to FIG. 7, the present embodiment may also incorporate a blower or dryer assembly 260 which is mounted to the side wall or to a rear wall of the housing. The blower is designed to direct air across the parts which have been cleaned and which are being carried by the conveyor toward the discharge station. With the blower in use, the parts will be dried as they descend to a point of being removed by the slides and deposited on the discharge conveyor.

The foregoing description of the preferred embodiment of the invention has been presented to illustrate the principles of the invention and not to limit the invention to the particular embodiment illustrated. It is intended that the scope of the invention be defined by all of the embodiments encompassed within the following claims and their equivalents.

What is claimed is:

1. A parts washing system comprising;
   at least one wash tank adapted to retain a cleaning solution therein,
   means mounted generally centrally of said at least one wash tank for creating turbulence of a cleaning solution within said wash tank directed toward opposite side walls of said wash tank,
   an endless conveyor extending from a parts loading station to a parts discharging station, said endless conveyor including at least first and second vertical runs extending through said at least one wash tank with said first and second vertical runs extending on opposite sides of said means for creating turbulence within said at least one wash tank,
   a plurality of means for carrying parts mounted in spaced relationship to said endless conveyor, and each of said plurality of means for carrying parts being pivotally mounted to said endless conveyor.

2. The parts washing system of claim 1, including means for filtering a washing solution within said at least one wash tank, said means for filtering including pump means for recirculating the cleaning solution from said at least one wash tank through a filter and thereafter returning filtered wash solution to said at least one wash tank.

3. The parts washing system of claim 1, including a plurality of wash tanks, at least one of said plurality of said wash tanks including a central discharge header, turbo charger means mounted within said at least one of said plurality of wash tanks for recirculating cleaning solution into said discharge header, and means in opposite side walls of said discharge header for directing fluid flow outwardly therefrom towards said opposite side walls of said at least one of said plurality of wash tanks.

4. The parts washing system of claim 3 in which said means for creating turbulence within one of said plurality of wash tanks includes an ultrasonic insert, said ultrasonic insert including a plurality of transducer elements oriented in opposite directions towards said opposite side walls of said at least one wash tank, and means for electrically connecting each of said transducers to a source of power.

5. The parts washing system of claim 3, including a rinse tank, and said endless conveyor including at least two vertical runs extending through said rinse tank.

6. The parts washing system of claim 5, including means for at least partially drying parts being discharged from said rinse tank.

7. The parts washing system of claim 1, including a plurality of wash tanks, at least one of said plurality of said wash tanks including a central discharge header, turbo charger means mounted within said at least one of said plurality of wash tanks for recirculating cleaning solution into said discharge header, and means in opposite side walls of said discharge header for directing fluid flow outwardly therefrom towards said opposite side walls of said at least one of said plurality of wash tanks.

8. A parts washing system comprising; a housing, at least one wash tank mounted within said housing and having an open upper end, front and rear and opposite side walls, and a lower portion, a liquid discharge header mounted within said wash tank intermediate said opposite side walls thereof, means adapted to recirculate a cleaning solution within said wash tank from said wash tank and into said liquid discharge header, said liquid discharge header including means adapted for discharging recirculating cleaning solution therefrom into said wash tank and generally toward said opposite side walls of said wash tank, an endless conveyor mounted within said housing and having at least first and second vertical runs extending within said wash tank with said first and second vertical runs being positioned on opposite sides of said discharge header, and carrier means pivotally mounted to said continuous conveyor adapted to support a plurality of parts thereon.

9. The parts washing system of claim 8 further including a cleaning solution outlet in said lower portion of said wash tank, means for connecting said cleaning solution outlet to means for filtering contaminants from a washing solution, and means for connecting said means for filtering to a fluid inlet in said wash tank.

10. The parts washing system of claim 8 including a parts loading station, and a vertical conveyor run extending from said parts loading station to said first vertical run.

11. The wash system of claim 10 further including a parts feed conveyor having a discharge end adjacent said parts loading station, at least one support means mounted at said parts loading station for retaining parts discharged by said parts feed conveyor, and said carrier means including a plurality of pivotal parts support elements.

12. The wash system of claim 11, including means for urging each of said pivotal parts support elements toward said at least one support means as said pivotal support elements pass through said loading station.

13. The parts washing system of claim 12, including a parts discharging station, another vertical conveyor run extending from said vertical conveyor run to said parts discharging station.

14. The wash system of claim 13 further including a parts discharge conveyor extending from said parts discharge station, at least one slide element mounted adjacent said another conveyor run at said parts discharge station, and means for pivoting said pivotal parts support elements toward said at least one slide element adjacent said discharge station whereby said at least one slide element engages parts carried by said pivotable part support elements and directs such parts to said discharge conveyor.

15. The parts washer of claim 14 wherein said endless conveyor includes at least two spaced conveyor chains, a first plurality of chain guide means mounted within said housing and a second plurality of chain guide means mounted within said wash tank, and means for rotating at least one of said plurality of first and second guide means to thereby drive said endless conveyor.

16. The parts washer of claim 15 in which each of said guide means includes a pair of spaced sprockets mounted to a common support rod, said at least first and second chains being guidingly engaged with said spaced sprockets of each of said first and second guide means.

17. The parts washer of claim 8 in which said carrier means mounted to said endless conveyor includes a pair of spaced hook elements for selectively engaging parts thereon.

18. The parts washer of claim 8 in which said carrier means mounted to said endless conveyor includes a generally U-shaped support element pivotally mounted relative to said endless conveyor and at least one pin element extending vertically upwardly relative to said U-shaped support element.

19. The parts washer of claim 8 in which said carrier means mounted to said endless conveyor includes at least one basket element pivotally mounted with respect to said endless conveyor for supporting parts to be cleaned therein.

20. The parts washing system of claim 8 including a parts loading station, a vertical conveyor run extending from said parts loading station to said first vertical run, a parts discharging station, another vertical conveyor run extending from said vertical conveyor run to said parts discharging station, means for automatically loading parts onto said carrier means at said loading station and means for automatically removing parts from said carrier means at said discharge station.

* * * * *